Patent text page

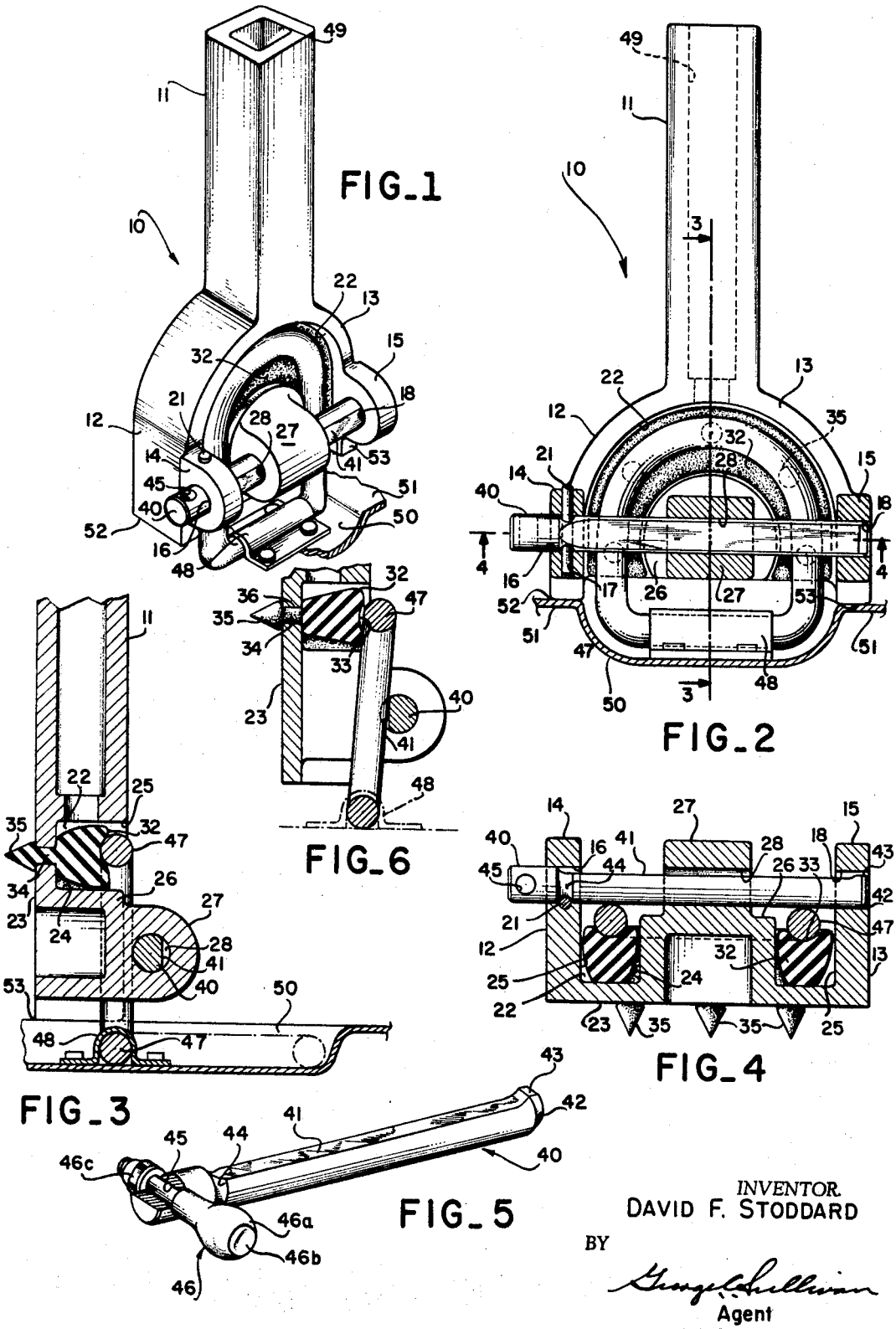

United States Patent Office
3,388,437
Patented June 18, 1968

3,388,437
CONNECTING APPARATUS
David F. Stoddard, Marietta, Ga., assignor to Lockheed Aircraft Corporation, Burbank, Calif.
Filed Apr. 29, 1965, Ser. No. 451,931
9 Claims. (Cl. 24—230)

ABSTRACT OF THE DISCLOSURE

A connecting ring engaging apparatus including a body having a receptacle for receiving a locking ring such as a D-ring. A resilient pad is provided in the receptacle, and the locking member includes a shaft which slides into place over the receptacle to retain the locking ring in place and which has a cam portion to press firmly the locking ring against the resilient pad.

---

This invention relates in general to connecting apparatus and in particular to a connecting apparatus permitting rapid attachment to and detachment from D-rings or the like.

There are many situations wherein it is desired to removably secure an article in a fixed position with respect to the mounting member on which the article is secured. An example of such a need is found in the field of cargo handling and carrying wherein cargo to be transported is placed within an aircraft, railway car, truck or other carrier; this cargo must be immovably secured within the carrier so that neither the cargo nor the carrier will be damaged by acceleration or deceleration of the carrier in transit. Another example of this need is found in the field of transportation wherein it is desirable temporarily to equip a carrier, such as a cargo aircraft, with such diverse and alternative accessories as seats, litters, tables or other apparatus to enable the carrier to perform a number of specialized functions. From these needs there arises a requirement for a securing or connecting apparatus which advantageously can be used to removably attach an article or a cargo load to a carrier.

A connecting apparatus useful for such purposes should be capable of quick and easy manipulation and should be operable without a requirement for special tools. The apparatus should have a minimum of moving parts and should be relatively light in weight to facilitate its use in aircraft without penalizing the cargo carrying capacity of the aircraft. Preferably, such a connecting apparatus should be compatible with existing cargo tie down devices contained in the carrier and should not require the addition to the carrier of new tie down devices adapted only for use with the connecting apparatus.

According to the present invention, there is provided a connecting apparatus that is capable of use with the conventional D-ring, as found in cargo carriers, and which is readily and quickly attachable to such D-rings without requiring the use of tools or additional parts which are susceptible to becoming lost or misplaced and without resort to chains or other similar devices to secure together the components of the apparatus. The apparatus of this invention can be economically manufactured inasmuch as no especially threaded parts or components are used.

Accordingly, it is an object of this invention to provide an improved connecting apparatus.

Another object of this invention is to provide a connecting apparatus capable of use with a conventional tie down device.

Still another object of this invention is to provide a connecting apparatus that is capable of being easily and readily attached to and detached from a tie down device.

A further object of this invention is to provide a connecting apparatus requiring no tools or implements in its operation.

A still further object of this invention is to provide a connecting apparatus that is self-contained and utilizes no normally separable components.

Yet another object of this invention is to provide a connecting apparatus which permits a cargo carrier to be rapidly adapted to perform a particular task.

The exact nature of this invention, as well as other objects and advantages thereof, will be readily apparent from consideration of the following specification relating to the annexed drawing in which:

FIGURE 1 shows a perspective view of an embodiment of this invention as connected to a conventional D-ring;

FIGURE 2 shows a front elevation view partially in section of the embodiment of FIGURE 1;

FIGURE 3 shows a section view taken along line 3—3 of FIGURE 2;

FIGURE 4 shows a section view taken along line 4—4 of FIGURE 2;

FIGURE 5 shows a perspective view of an element of the embodiment shown in FIGURE 1; and FIGURE 6 shows a partial section view of the embodiment shown in FIGURE 1 in an intermediate stage of connection to a D-ring.

In general, the embodiment of this invention shown and described herein includes a body member having a portion in which is provided a semi-annular recess containing a resilient pad against which is received a portion of a D-ring. Once a D-ring is pivoted into contact with this pad, a locking bolt is passed through apertures on upstanding portions of the body member to retain the D-ring in place. The locking bolt is dimensioned and configured so that a partial turn of this bolt presses the D-ring firmly into contact with the pad and also causes the bolt to be locked in place with respect to the body member.

More particularly and with respect to FIGURE 1, there is shown an embodiment of this connecting apparatus having a body member indicated generally at 10 and including an attaching member 11 formed at one end thereof to define a pair of arms 12 and 13. Arm 12 has an ear portion 14 upstanding therefrom while arm 13 has a corresponding ear portion 15 upstanding therefrom, ear portions 14 and 15 being located at corresponding points on the respective arms. Ear portion 14 has therein a locking bolt bore 16 and ear portion 15 has therein a locking bolt bore 18, with bores 16 and 18 having a common axis as shown in FIGURES 2 and 4 of the drawing. Ear portion 14 has a pin bore 17 contained therein substantially transversely to locking bolt bore 16, pin bore 18 being positioned with respect to bore 16 so that a pin 21 disposed within bore 18 will have a portion of its length contained within bore 16. This arrangement is best shown in FIGURE 4.

Referring to FIGURE 2, arms 12 and 13 are configured so that, taken together, these arms substantially form a semicircle as seen in plan view. Arms 12 and 13 are of substantially U-shaped section to form a semicircular channel 22 having a base portion 23 and side wall portions 24 and 25, this construction being best shown in FIGURE 3. It can be seen that this channel 22 is substantially coextensive with arms 12 and 13. Situated proximately at the center of the semicircular channel 22 is an upstanding portion 26 formed in part by side wall portion 24. Contained on upstanding portion 26 is a lug member 27 having therein a bore 28 that is coaxial with each of bores 16 and 18.

A generally C-shaped pad 32 made, for example, of a resilient material such as rubber or the like is received within channel 22. Pad 32 may contain in the portion thereof facing outwardly of channel 22 a shallow recess 33 for a purpose to be described below. Pad 32 may be retained within channel 22 by one or more of a number of attaching techniques such as, for example, a suitable adhesive or the provision of a plurality of protrusions 34 formed integrally with pad 32 and having enlarged conical portions 35 contained thereon. When the protrusions 34 are passed through mating bores 36 contained in base portion 23 of channel 22, the conical portions 35 expand and retain pad 32 in place.

Receivable through bores 16 and 18 in ear portions 14 and 15, respectively, and through bore 28 in lug member 27 is a locking bolt 40 of sufficient length that when the bolt 40 is fully received within the aforementioned bores, a portion of the bolt containing handle 46 remains extended beyond ear portion 14. As best shown in FIGURE 5, bolt 40 includes a first flat portion 41 contained along a substantial part of the bolt length, a chamfered end 42, and a second flat portion 43 contained on the chamfered end portion, with first flat portion 41 and second flat portion 43 being contained in parallel planes. An annular undercut portion 44 extends around the periphery of the bolt at the end of first flat portion 41 remote from chamfered end 42. It can be noted that one end of first flat portion 41 extends into and eliminates a portion of annular undercut portion 44. A suitable hole 45 is provided for connection of handle 46. By way of example, handle 46 may comprise a ball knob 46a mounted by means of a bolt 46b and nut 46c.

Assembly of the connecting apparatus from its three basic components is accomplished by attaching pad 32 in a manner as described above and then by inserting bolt 40 through bores 16, 28 and 18 until annular undercut portion 44 is aligned with pin bore 17 contained in ear portion 14. A suitable locking device, such as pin 21, then is driven or otherwise disposed within bore 17. It can be seen that the first flat portion 41 and pin 21 are dimensioned so that bolt 40 cannot be withdrawn from the position in which the bolt fully engages ear portions 14 and 15 and lug member 27 unless the bolt is rotated to place first flat portion 41 in substantial alignment with pin 21. Only when this is accomplished can bolt 40 be withdrawn from ear portion 15 and lug member 27. It can further be seen that the end of the bolt containing second flat portion 43 is dimensioned with respect to pin 21 so that, upon withdrawal of bolt 40 through ear portion 14 from ear portion 15 and lug member 27, this bolt end engages pin 21 to prevent complete removal of the bolt from ear portion 14 of the connecting apparatus. Chamfered end 42 enables bolt 40 to be quickly and easily reinserted into the bores of lug member 27 and ear portion 15.

In the use of this invention as embodied herein, the connecting apparatus is attached or affixed to a cargo or other object which is desired to be removably secured in place. Such attachment may be, by way of example, through hollow portion 49 of attaching member 11. The details of attaching member 11 are shown only generally inasmuch as it is realized that these details form no part of the present invention and may vary according to the cargo or other object with which the connecting apparatus is used. Assuming that the space in which the tie down is to be accomplished contains one or more conventional D-rings, as shown at 47, attached to a floor or other surface by means of bracket 48, one or more of the connecting apparatus will be associated with the object such that when the object is placed in this space each connecting apparatus will be in substantial alignment with a D-ring 47. Such D-rings are, for example, mounted in a recessed member 50 suitably attached to the carrier and including portions 51 for making contact with ends 52 and 53 of arms 12 and 13, respectively.

Once the object as equipped with the connecting apparatus is suitably positioned, bolt 40 is rotated to permit withdrawal of the bolt from ear portion 15 and lug member 27 so that the D-ring 47 can be pivoted into proximate contact with shallow recess 33 of pad 32. The presence of pad 32 minimizes the effect of minor misalignment between the D-ring and the apparatus. Bolt 40 then is reinserted through lug member 27 into ear portion 15. At this point the relative arrangement of D-ring 47, bolt 40, first flat portion 41 and pad 32 is as shown in FIGURE 6, with D-ring 47 resting lightly against shallow recess 33 and with first flat portion 41 being in juxtaposition to the D-ring. Second flat portion 43 of bolt 40 permits ready passage of the bolt past the D-ring when the bolt is being inserted through lug member 27 into ear portion 15.

Bolt 40 next is rotated so as to bring first flat portion 41 out of juxtaposition with the D-ring and to cause camming of the D-ring 47 inwardly of channel 22 and into firm engagement with shallow recess 33 of pad 32. Once this is done it can be seen that the D-ring is firmly and immovably engaged with the connecting apparatus and that movement of the connecting apparatus or the object to which it is connected cannot be accomplished unless bolt 40 is rotated to permit withdrawal of the bolt from the connecting apparatus.

Although pad 32 has been described as having a shallow recess 33 in the surface thereof receiving the D-ring, this pad alternatively can have a plane surface substituted for the shallow recess 33. Use of a plane surface renders the apparatus more adaptable for use with D-rings of different sizes, while use of the shallow recess provides increased gripping force on D-rings of a predetermined size.

When bolt 40 was rotated to cause camming of the D-ring into pad 32, first flat portion 41 was rotated out of alignment with pin 21 so that bolt 40 was rotated to a position wherein withdrawal of the bolt from the connecting apparatus is impossible. The force of the D-ring against the bolt, caused by the resilient nature of pad 32, prevents the bolt from rotating inadvertently due to vibration or other unwanted disturbance into a position wherein first flat portion 41 is in juxtaposition with the D-ring. However, if desired, some suitable positive locking means such as, for example, a clip mounted on arm 12 for engagement with handle 46 may be provided to ensure that the bolt cannot accidentally be rotated to a position that will permit removal of the bolt and disengagement of the D-ring from the connecting apparatus. Handle 46 has been omitted from FIGURES 1, 2 and 4 for purposes of clarity, although it will be understood that handle 46 is permanently attached to locking bolt 40 during the normal operation of the connecting apparatus. In the embodiment as shown, handle hole 45 is oriented with respect to first flat portion 41 so that ball knob 46a is disposed downwardly of the bolt 40 when the D-ring is locked in place. This ensures that the force of gravity will aid in retaining the bolt in its locked position.

From the foregoing description, it can be seen that there has been disclosed and described a connecting apparatus that is capable of quick and easy attachment to and detachment from the conventional D-ring anchor device. The connecting apparatus of this invention uses no threaded members requiring expensive and time-consuming machining operations to produce, nor does this connecting apparatus have any components which are detachable from the device in the normal course of operation and which may be subject to being lost or misplaced. This connecting apparatus is actuated by a turn of handle 46, which may be accomplished without tools and while the operator is wearing gloves or other dexterity-impeding devices on his hands. This connecting apparatus can be cast or otherwise produced from lightweight metals to minimize its weight, this being a consideration particularly with regard to aircraft applications wherein a number of such connecting apparatus may be used in an aircraft.

Bolt 40 may be designed to include a provision, such as a slotted or hexagonal head, for application of an external wrenching device, if desired. This may be provided in lieu of handle 46 or in addition to this handle.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. Connecting apparatus for use with an anchor device, comprising:
   a body member;
   said body member having a U-shaped channel means disposed at a portion thereof;
   said channel means being configured to receive a portion of the anchor device;
   at least two upstanding means projecting outwardly from spaced apart locations on said body member;
   each of said upstanding means containing a bore, said bores being coaxial with respect to each other; and
   locking means receivable within said bores for axial and rotational movement therein, said locking means having a cam portion disposed along a portion of its length so that when said locking means is journaled in said bores rotation of said locking means causes said cam portion to reciprocate with respect to said channel means to cause an anchor device received between said channel means and said locking means to be directed toward said channel means.

2. Apparatus as in claim 1, further comprising resilient means received in said channel means, said resilient means being so dimensioned that at least a portion of the anchor device when directed toward said channel means through rotation of said locking means is firmly engaged with said resilient means.

3. Apparatus as in claim 1, further comprising an upstanding member positioned at said portion of said body member at a location intermediate of said upstanding means and in substantial alignment with said upstanding means, said upstanding member containing a bore coaxial with said bores in said upstanding means.

4. Connecting apparatus for use with an anchor device, comprising:
   a body member;
   said body member having a receptacle formed as a portion thereof, said receptacle being configured to receive an anchor device;
   said body member further having a pair of locking means support members disposed in opposing relation at the edge of said receptacle and positioned outwardly of the open portion of said receptacle within which an anchor device is received;
   said locking means support members being journaled to receive a locking means;
   locking means receivable within said journaled portion of said locking means support members, said locking means being withdrawable from said locking means support members sufficiently to permit an anchor device to be received in said receptacle and being insertable into said locking means support members to retain the anchor device in said receptacle; and
   retaining means associated with one of said locking means support members to prevent complete removal of said locking means therefrom.

5. Apparatus as in claim 4, further comprising resilient means disposed in said receptacle and dimensioned to contact at least a portion of an anchor device retained in said receptacle.

6. Apparatus as in claim 5, wherein:
   said locking means comprises a substantially cylindrical member axially and rotatably receivable in the journaled portion of said locking means support member;
   said cylindrical member having a cam portion diposed intermediate the ends thereof to cause an anchor device received in said receptacle to be moved inwardly of said receptacle into firm engagement with said resilient means when said cylindrical member is journaled in said locking means support members and is rotated therein.

7. Apparatus as in claim 6, wherein said cam portion comprises a flat portion formed along a portion of the length of and intermediate the ends of said cylindrical members.

8. Apparatus as in claim 7, wherein:
   said cylindrical member has an annular groove on the periphery thereof, said groove being positioned on said cylindrical member to coincide with an end of said flat portion;
   said retaining means comprising a protrusion disposed in the journaled portion of one of said locking means support members for engagement with said annular groove;
   the dimensions of said annular groove, said flat portion, and said protrusion being such that when said cylindrical member is rotated to place said flat portion into substantial alignment with said protrusion said cylindrical member can be withdrawn from said locking means support members.

9. Connecting apparatus for use with an anchor device, comprising:
   a body member;
   said body member having a channel means disposed at a portion thereof, said channel means being configured to received a portion of the anchor device;
   locking means contained on said body member, said locking means including an axially extending member being selectively axially movable to a first position to permit the anchor device to be freely disposed in or withdrawn from said channel means and to a second position wherein said locking means passing over at least a portion of said channel means and exerts engagingly retaining force on an anchor device disposed in said channel means;
   means contained on said body member for selectively retaining said axially extending member in said second position; and
   resilient means received in said channel means, said resilient means being so dimensioned that at least a portion of the anchor device when retained in place by said locking means is firmly engaged with said resilient means.

References Cited

UNITED STATES PATENTS

| | | | |
|---|---|---|---|
| 230,827 | 8/1880 | Sofield | 24—230.1 |
| 977,530 | 12/1910 | Mitchell | 24—201.4 |
| 2,942,561 | 6/1960 | Cheshire | 105—369 |
| 3,183,568 | 5/1965 | Gaylord | 24—230.1 |

FOREIGN PATENTS

| | | |
|---|---|---|
| 31,907 | 2/1908 | Austria. |
| 1,384,874 | 11/1964 | France. |
| 122,016 | 7/1901 | Germany. |
| 1,023,451 | 3/1966 | Great Britain. |

BERNARD A. GELAK, *Primary Examiner.*